UNITED STATES PATENT OFFICE.

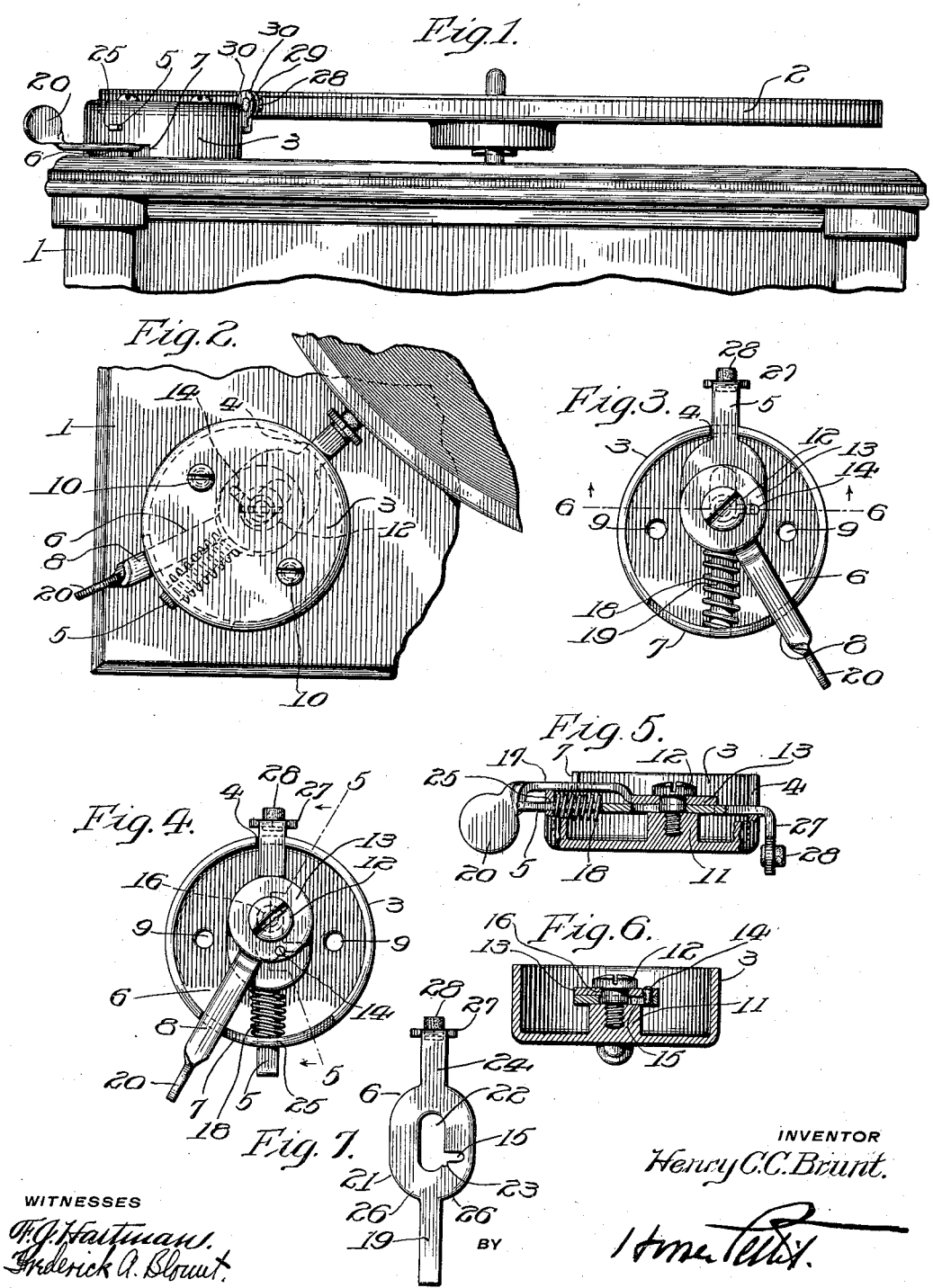

HENRY C. C. BRUNT, OF COLLINGSWOOD, NEW JERSEY, ASSIGNOR TO VICTOR TALKING MACHINE COMPANY, A CORPORATION OF NEW JERSEY.

FRICTION-BRAKE.

1,022,656.  Specification of Letters Patent.  Patented Apr. 9, 1912.

Application filed April 15, 1908. Serial No. 427,180.

*To all whom it may concern:*

Be it known that I, HENRY C. C. BRUNT, of Collingswood, State of New Jersey, have invented certain new and useful Improvements in Friction-Brakes, of which the following is a full, clear, and exact description, reference being had to the accompanying drawings, forming a part of this specification.

My invention relates to improvements in friction brakes in general, and more specifically to friction brakes used in connection with talking machines.

The principal object of my invention is to provide a simple and efficient friction brake which may be readily applied to a moving part of a motor or similar mechanism, and easy of operation.

A further object of my invention is to provide a friction brake for use in connection with gramophones and other sound reproducing machines, in which a desirable yielding pressure is applied to the turn-table or sound record support of a talking machine; in which the brake member may be locked out of engagement with the turn-table or other moving part of a talking machine; and in which the brake member may be easily placed in and out of engagement with the turn-table or other moving part of a motor or driving mechanism of a talking machine.

A further object of my invention is to provide a friction brake, in which the brake member moves slowly and is applied gradually to the moving element, the movement of which is desired to be stopped, thus preventing the sudden stopping of the moving element, which is very liable to injure the delicate parts of the operating mechanism.

A further object of my invention is to provide a friction brake, nearly all the parts of which may be stamped out of sheet metal at a very much less cost than by casting the same, the method heretofore used in making the parts of friction brakes previously used.

With these objects in view, together with other objects which will appear in the following specification, my invention consists in the construction, combination and arrangement of the parts, such as will be hereinafter pointed out in the claims made hereafter.

Referring to the accompanying drawings, in which similar reference figures indicate like parts; Figure 1 is a side elevation showing part of the cabinet or casing of a talking machine, and a turn-table mounted in the usual manner on the spindle of a spring motor contained within said casing, with my improved friction brake applied thereto; Fig. 2 is a top plan view illustrating a portion of a talking machine with my improved friction brake applied to the turn-table or sound record support thereof; Fig. 3 is a bottom plan view of the friction brake showing the positions which the parts take when the brake member is applied; Fig. 4 is a bottom plan view showing the position which the parts take when the brake member is not applied; Fig. 5 is a longitudinal sectional view taken on the line 5—5 of Fig. 4; Fig. 6 is a longitudinal sectional view taken on the line 6—6 of Fig. 3; and Fig. 7 is a detailed view of the brake member.

Referring particularly to the drawings, 1 indicates the cabinet or casing of a talking machine in which is contained the motor mechanism, by which is rotated the turn-table 2, which is mounted in the usual manner on a driving spindle of the motor; 3 the casing of my improved friction brake, which is preferably made of metal, and in which is provided a slot 4 in which the inner part 5 of the brake member 6 moves and is loosely guided by the sides thereof, and a recess 7, the ends of which determine the points to which the actuating member or cam lever 8 may be moved. In the casing 3 are the holes 9—9, through which pass the screws 10—10, by means of which the casing and the parts carried by it may be firmly fixed to the casing of a talking machine or other supporting means within the casing. Upon the inner surface of the top of said casing 3 is provided a screw threaded projection or boss 11, which is adapted to receive the screw or pivot 12, by means of which the movable parts are fastened within the casing 3, and about which, as a pivot, the said parts move. The actuating member or cam lever 8 has an inner end 13 of suitable width to carry a pin or stud 14, which is adapted to move in the slot or recess 15 of the brake member 6, and also to provide a hole 16 through which passes the pivot 12. The offset 17 of the cam lever 8 is of sufficient elevation so that when the cam lever is moved laterally about the pivot 12, it will clear the coiled spring 18 surrounding the outer projection 19 of the brake member 6, the offset 17 terminating in a projection or thumb piece 20. The cam lever 8 is of suitable length so that the thumb piece 20 will extend through the recess 7, and is without the casing 3 when the parts of my improved friction brake are assembled.

The brake or reciprocating member 6, of which a detailed view is given in Fig. 7, has a widened central part 21, in which there is a longitudinal slot 22, through which passes the pivot 12. The longitudinal slot 22 is of suitable length to permit the brake member 6 to be moved longitudinally the required distance. In one side of the slot 22 is another slot or recess 15, which co-acts with the pin 14 of the actuating member in a cam like movement. The lower side of the slot terminates in a notch 23, in which the pin 14 of the actuating member 8 becomes seated when it is desired to lock the brake member 6 out of engagement or contact with the turn-table. Extending longitudinally from the widened central portion 21 of the brake member, and in opposite directions are the projections 19 and 24. The projection 19 is adapted to pass through the opening 25 in the casing 3, which is diametrically opposite to the slot 4 in said casing, and the sides of which guide the movement of the said projection 19. Surrounding the said projection 19, one end abutting on the shoulders 26 of the brake member 6, and the other end abutting on the interior of the casing 3, is a coiled spring 18, the pressure of which tends to throw the brake member 8 into engagement with the periphery of the turn-table, and to hold it in position. The projection 24, which passes through the slot 4 of the casing and extends beyond the said casing, terminates in an upwardly extending portion 27, in which is placed the brake pad 28, which may be of leather or other suitable material, which is durable and which gives a yielding pressure. The brake pad 28 is suitably mounted within an opening 29 and extends slightly beyond the surface of the up-turned portion 27. The upper end of 27 is split, forming the ends 30—30, and when it is desired to remove or replace a brake pad, this may be easily done by springing apart the ends 30—30, thus enlarging the hole 29. When the brake pad has been replaced, the ends 30—30 will, by the elasticity of the metal, spring together again and hold the brake pad firmly.

The operation of my improved friction brake is as follows: The normal position of the parts, that is when the brake pad is in contact with the periphery of the turn-table, is as shown in Figs. 1, 2, and 3. When it is desired to have the turn-table rotated, the actuating member or cam lever 8 is moved to the right, Figs. 1 and 2. The pin 14 of the actuating member 8 moves along the lower edge of the slot 15, exerting a downward pressure thereon, forcing the brake member 6 to move longitudinally away from the turn-table, and compressing the spring 18. The pin finally becomes seated in the notch 23, as best shown in Fig. 4, and the parts are held firmly locked, a portion of the projection 19 of the brake member extending without the casing, and the coiled spring being compressed between the shoulders 26—26 and the interior of the casing. When it is desired to apply the brake member, the actuating member or cam lever 8 is moved to the left, Fig. 2, or to the right, Fig. 4, causing the pin 14 to jump out of the notch 23, releasing the spring 18, which by its pressure throws the brake member forward until the brake pad 28 comes in contact with the periphery of the turn-table, thereby causing the turn-table to cease rotating and to be held motionless. The distance to which the brake member 6 may thus be moved by the action of the spring 18 is determined by the outer end of the slot 22 coming in contact with the pivot 12, as shown in Fig. 3. It is not necessary, however, in the operation of my improved friction brake that the pivot 12 should be in contact with the end of the slot 22 when the brake member has been applied to and has stopped the rotation of the turn-table, as the pivot may occupy any intermediate position between the ends of the slot 22, and the brake member still prevent the turn-table from rotating. For this reason it is not necessary to employ extreme care or accuracy in adjusting the casing with reference to the periphery of the turn-table. It is only necessary that the casing be fixed in a position in which the brake pad will come in contact with the periphery of the turn-table when the spring 18 is released. When the spring 18 is released, throwing the brake member 6 forward, the said brake member is prevented from being thrown into sudden contact with the periphery of the turn-table 2 by the action of the pin 14 within the slot 15. The movement of the pin 14, when the lever 8 is moved in either direction, is radially about the pivot 12 as a center, and when the spring 18 is released, the said pin 14 moves from the notch 23 to the inner end of the slot 15, as shown in Figs. 2, 3 and 6. It is, therefore, evident that the action of the spring 18 when released, in throwing forward the brake member 6, is retarded by the amount of force necessary to cause the pin 14 to move from the outer end of the slot along the lower side or edge of the said slot until it takes the position at the inner end of said slot 14, shown in Figs. 2, 3 and 6, the amount of force necessary to accomplish this work being not only to overcome the friction between the said pin 14 and the lower side or edge of the slot 15, but also the consequent movement of the lever 8 about the pivot 12 from its position as shown in Fig. 4 to the position which it takes as shown in Figs. 2 and 3. By these means is brought about the gradual movement of the brake member and the brake pad 28 is thus at first brought gently into contact with the periphery of the turn-table 2, affording a slight resistance to the rotating movement of the turn-table, which resistance, however, increases gradually until the turn-table is brought to a standstill.

It is obvious that the construction, combination and arrangement of my improved friction brake, which I have herein described may be used as a brake in connection with any machine or device in which there is a moving part or element to which the brake pad may be applied. In the accompanying drawings and in the foregoing description I have, however, shown the application of my improved friction brake to a talking machine in which disk sound records are used, but do not limit myself to its use in that connection alone, and, of course, various changes could be made in the details of construction illustrated without departing from the spirit and scope of my invention.

Having thus described my invention, what I claim and desire to secure by Letters Patent is:

1. In a talking machine brake, the combination with a brake member having a recess, of an actuating member carrying means arranged to be moved in a rotary path to engage the walls of said recess and to effect a reciprocatory movement of said brake member, means limiting the movement of said brake member, and means adjacent to one end of said recess and arranged to lock said member to prevent the relative movement of said brake member and said actuating member.

2. In a talking machine brake, the combination with a brake member having a recess, and a notch, of an actuating member having means arranged to be shifted in a circular path to engage the walls of said recess and to effect a reciprocatory movement of said brake member, and to engage said notch to prevent the accidental relative movement of said member.

3. In a friction brake for talking machines, the combination of a casing, a cam lever, a brake member co-acting with said cam lever, a turn-table, a brake pad mounted upon said brake member, and a pin mounted upon said cam lever, said brake member having a notch therein adapted to receive and firmly hold the said pin, thereby locking the brake member out of contact with said turn-table.

4. The combination with a brake member arranged for reciprocation, of a lever, a pin carried by said lever arranged to be shifted in an arc to engage a plane surface and reciprocate said brake member by oscillation of said lever, said brake member having a notch disposed to engage said pin to prevent the accidental relative movement of said member.

5. In a talking machine brake, the combination with a moving element, of a slotted reciprocatory brake member mounted to be brought into contact with the moving element, a lever, and a pin carried by said lever arranged to be swung in an arc, and to engage the slotted brake member and shift it toward or away from the moving element, said brake member being provided with a notch for engagement with said pin to prevent accidental relative movement of said lever.

6. In a talking machine brake, the combination with a normally moving element, of a slotted reciprocatory brake member mounted to be brought into contact with said normally moving element, an oscillatory lever and a projection carried by said lever distinct from said reciprocatory brake member arranged to be shifted within the slot in said brake member to move it toward and away from the normally moving element, said slot being provided with a notch in which said projection is adapted to operate.

7. In a talking machine brake, the combination with a normally moving element, of a sheet metal casing, a transversely slotted reciprocating sheet metal brake member mounted to be brought into contact with the normally moving element, and a sheet metal lever carrying a pin engaging the transverse slot in said brake member to move it toward or away from the moving element, said transverse slot being provided near one end with a notch adapted to hold said pin to prevent accidental relative movement of said lever.

8. In a talking machine brake, the combination with a movable brake member having a slot and a recess extending laterally therefrom, of a lever, a pivot for said lever extending through said slot, a pin on said lever arranged to be shifted in a circular path thereby, to engage said recess and shift said brake member relative to said lever, and a notch situated near one end of said recess for coöperating with said pin to prevent the accidental relative movement between said lever and brake member.

9. In a talking machine brake, the combination with a movable brake member having a slot and a recess provided with a notch, extending laterally from said slot, of a lever, a pivot for said lever extending through said slot, and a pin on said lever arranged to be shifted in a circular path thereby, to engage said recess and shift said brake member relative to said lever, said slot containing a notch to coöperate with said pin to lock said brake member in an inoperative position.

10. In a friction brake, the combination of a casing, an actuating member, a brake member, coacting with said actuating member and a pin mounted upon said actuating member, said brake member having a notch therein adapted to receive and firmly hold the said pin, thereby locking the brake member.

11. In a friction brake for talking machines, the combination of a casing, an actuating member, a brake member coacting with said actuating member, a moving element in said talking machine, and a pin mounted upon said actuating member, said brake member having a notch therein adapted to receive and hold the said pin, thereby locking the brake member out of contact with said moving element.

12. In a brake, a casing, a brake member mounted to reciprocate therein, a lever rotatably mounted therein, said brake member having a slot therein, a pin on said lever arranged to be shifted in a circular path in said slot when said lever is rotated, a spring for holding said brake member in applied position, and means for locking said brake member in an inoperative position.

13. In a talking machine brake, the combination with a brake member having a recess, of an actuating member carrying means arranged to be shifted in a rotary path to engage the walls of said recess and thereby impart a reciprocatory movement to said brake member, and means within said recess arranged to limit the movement of said brake member, said recess being shaped so as to maintain said actuating member in one extreme position.

In witness whereof I hereunto set my hand this third day of April, 1908.

HENRY C. C. BRUNT.

Witnesses:
FREDERICK A. BLOUNT,
ALEXANDER PARK.

---

Copies of this patent may be obtained for five cents each, by addressing the "Commissioner of Patents, Washington, D. C."